United States Patent [19]

Pariani

[11] Patent Number: 4,828,458
[45] Date of Patent: May 9, 1989

[54] AUXILIARY HELICOPTER ROTOR

[75] Inventor: Emilio Pariani, Cardano Al Campo, Italy

[73] Assignee: Costruzioni Aeronautiche Giovanni Agusta S.p.A., Italy

[21] Appl. No.: 123,604

[22] Filed: Nov. 20, 1987

[30] Foreign Application Priority Data

Nov. 25, 1986 [IT] Italy .................. 67875 A/86

[51] Int. Cl.$^4$ .............................. B64C 27/38
[52] U.S. Cl. ................ 416/141; 416/123; 416/138
[58] Field of Search .......... 416/114, 134 A, 138 A, 416/140 A, 141 R, 123

[56] References Cited

U.S. PATENT DOCUMENTS

| | | | |
|---|---|---|---|
| 2,949,967 | 8/1960 | Jovanovich | 416/134 A |
| 3,942,910 | 3/1976 | Snyder et al. | 416/141 |
| 4,129,403 | 12/1978 | Watson | 416/138 A X |
| 4,135,856 | 1/1979 | McGuire | 416/138 A X |
| 4,257,739 | 3/1981 | Covington et al. | 416/134 A |
| 4,342,540 | 8/1982 | Lovera et al. | 416/138 A X |

FOREIGN PATENT DOCUMENTS 2122156 1/1984 United Kingdom ........... 416/140 A

*Primary Examiner*—Everette A. Powell, Jr.
*Attorney, Agent, or Firm*—Kane, Dalsimer, Sullivan, Kurucz, Levy, Eisele and Richard

[57] ABSTRACT

An auxiliary helicopter rotor on which at least two blades extend radially from a hub, each of which blades presents a root connecting it to the hub, and a beam having two wings extending respectively along the back and face of the blade; the wings of the beam diverging along the root in such a manner as to form a fork engaged both by a center plate on the hub, to which the fork is connected via a spherical joint, and by a flexible leaf extending from the center plate inside the fork and connected to the beam of the blade by means of an axial joint.

6 Claims, 4 Drawing Sheets

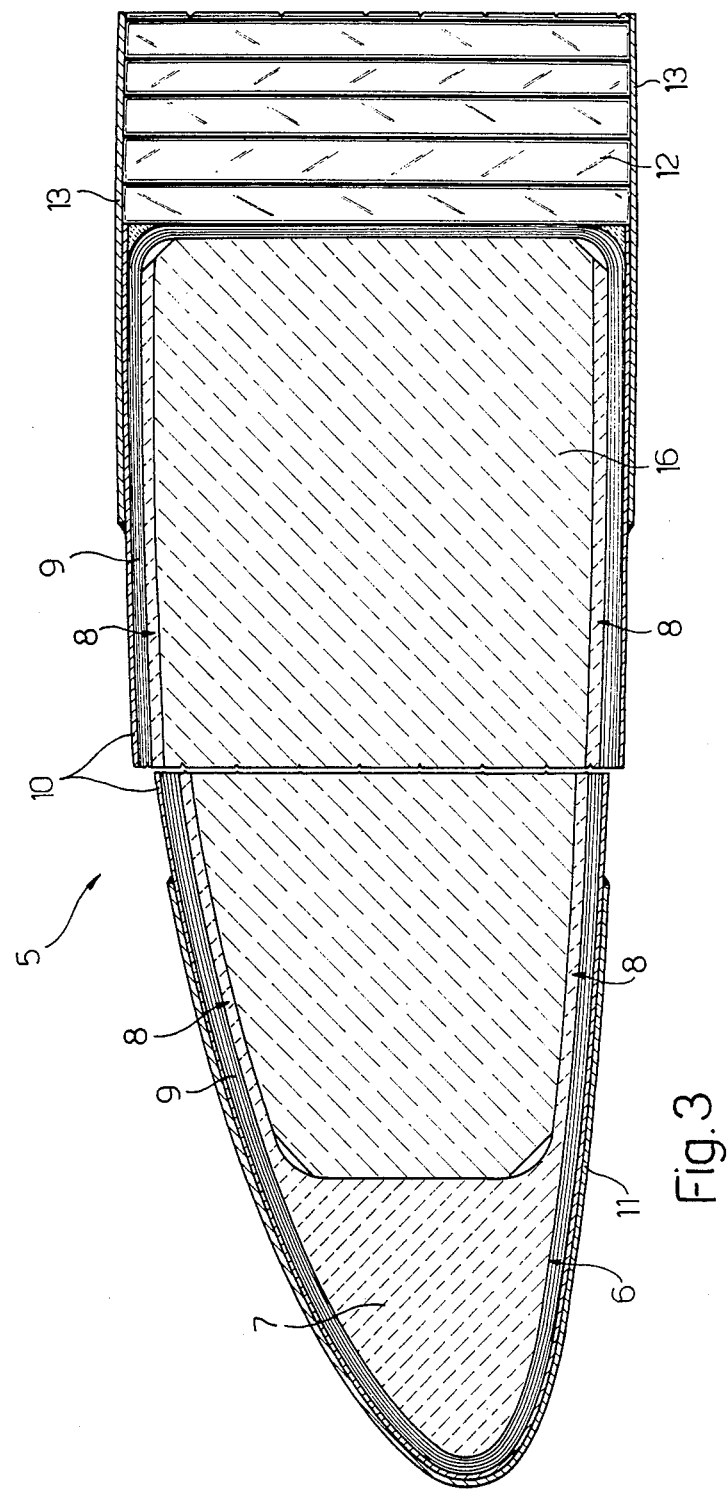

AUXILIARY HELICOPTER ROTOR

BACKGROUND OF THE INVENTION

The present invention relates to an auxiliary helicopter rotor.

The auxiliary rotors of advanced design helicopters usually comprise a center hub having two or more peripheral blades, each of which presents a root with two bores on the end facing the hub.

On know rotors of the aforementioned type, each blade is connected to the hub by means of an intermediate connecting element located between the respective blade and the hub, and substantially coaxial with the blade. At one end, the said connecting element presents a fork engaged by the respective blade root, and connected to the blade by means of two pins. At the other end, each connecting element is tubular in shape, and presents two axial appendixes defining a bore for hinging the blade-connecting element assembly to the hub by means of a spherical joint, and a lateral appendix for connecting a pitch-change lever.

For each said blade, the hub presents a substantially radial leaf located substantially in the plane of the respective said blade. Each said leaf extends inside the tubular end of the respective said connecting element, and is connected to the same be means of an axial elastomeric bearing.

Clearly, therefore, on known types of auxiliary rotors of the aforementioned type, connection of the blades to the hub is extremely complex, due to the presence of the said connecting elements. What is more, the strength required of the said connecting elements contributes greatly towards increasing the total weight of the auxiliary rotor as a whole.

SUMMARY OF THE INVENTION

The aim of the present invention is to provide an auxiliary rotor designed to overcome the aforementioned drawbacks.

With this aim in view, according to the present invention, there is provided an auxiliary helicopter rotor comprising a hub and at least two blades extending radially from the said hub; each said blade comprising a root for connecting it to the said hub, and a beam, in turn, comprising two wings extending respectively along the back and face of the said blade; the said hub comprising a center plate and, for each said blade, a leaf extending outwards from the said center plate and connected to the respective said blade; characterised by the fact that the said two wings of each said blade extend in diverging manner along the said root in such a manner as to form a fork engaged by the said plate; spherical joint means being located between the said fork and the said plate; each said leaf extending inside the respective said fork; and axial joint means being located between each said leaf and the said beam of the respective said blade.

BRIEF DESCRIPTION OF THE DRAWINGS

A non-limiting embodiment of the present invention will be described by way of example with reference to the accompanying drawings, in which:

FIG. 3 shows a section along line III—III in FIG. 2;

DETAILED DESCRIPTION OF THE INVENTION

Figure 1:
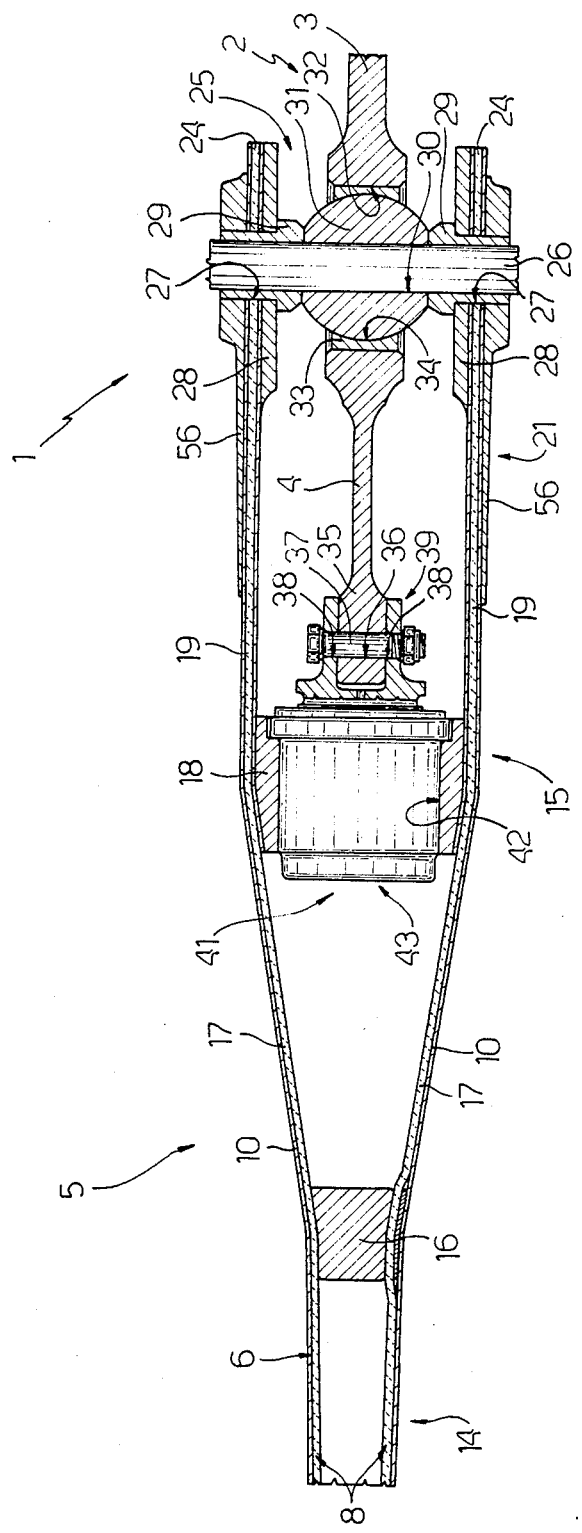
FIG. 1 shows a partial axial section of a preferred embodiment of an auxiliary rotor in accordance with the teachings of the present invention.

Number 1 in FIG. 1 indicates an auxiliary helicopter rotor, the hub 2 of which comprises a plate 3 perpendicular to the rotation axis (not shown) of rotor 1, and from which extend outwards at least two leaves 4 (only one of which is shown) located in the plane of plate 3 and each connected to a respective blade 5.

Figure 2:
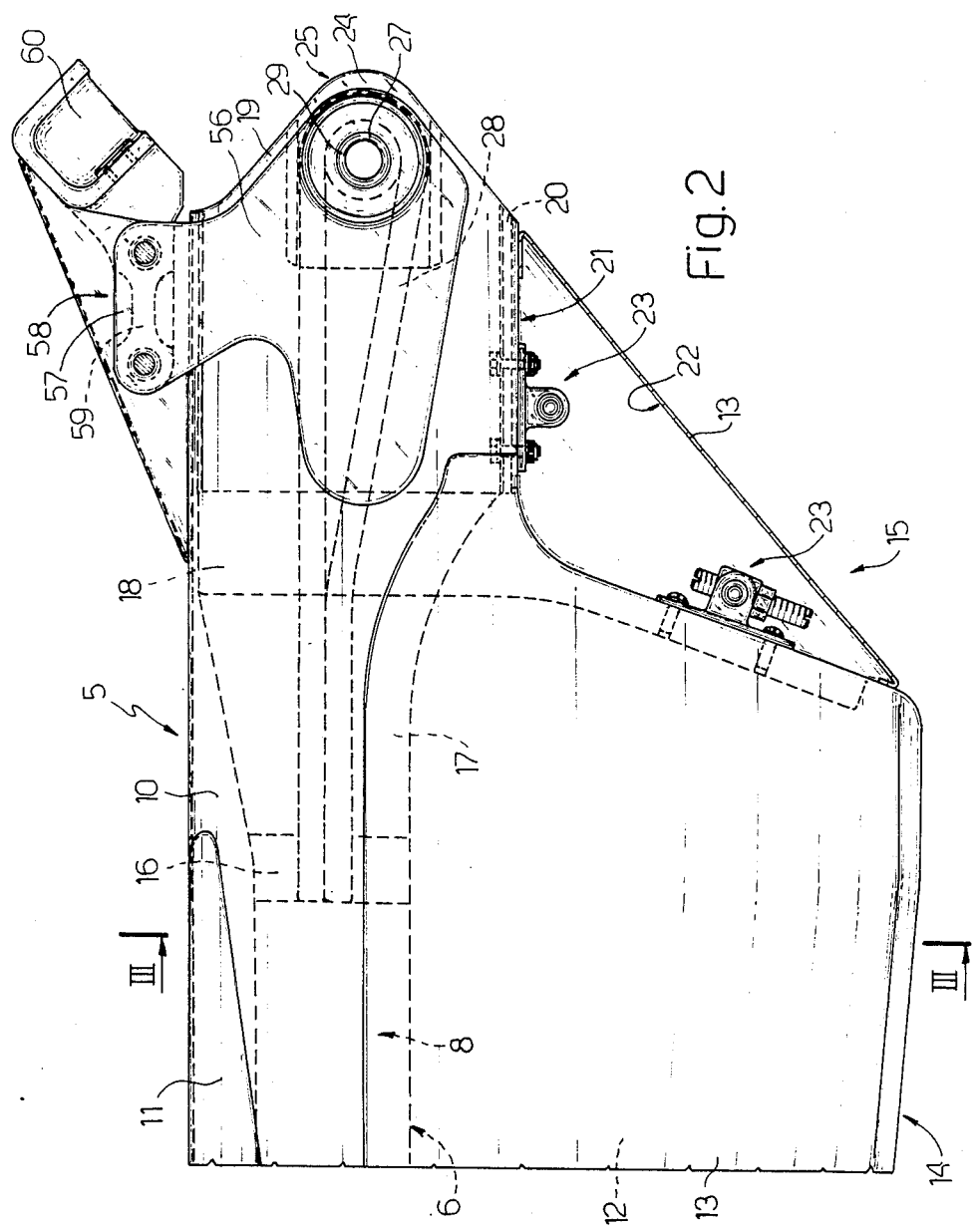
FIG. 2 shows a partially-sectioned plan view, with parts removed for simplicity, of a blade on the FIG. 1 rotor.

As shown, particularly in FIGS. 2 and 3, each blade 5 comprises a beam 6 preferably formed from composite material and extending along the full length of respective blade 5 of which is substantially defines a front leading portion.

The said beam 6 presents a substantially C-shaped section, and comprises a front center core 7 from which two wings 8 extend rearwards along the back and face of blade 5 respectively. Beam 6 presents a tubular outer covering 9, in turn, having a laminated steel outer covering 10, the front portion of which, extending abut the leading edge of blade 5, presents a further abrasionproof covering 11. The rear trailing portion of each blade 5 is formed from honeycomb 12 having an outer cover skin 13, the front portion of which partially covers laminated steel covering 10, for securing honeycomb 12 to beam 6.

Each blade 5 substantially consists of a wing portion 14 extending from the free end (not shown) of blade 5 and of substantially constant section, and a root 15 for connecting blade 5 to hub 2. The said two portions of each blade 5 are separated by a transverse rib 16 which, as shown in FIG. 3, engages between wings 8 of beam 6. Along the said wing portion 14, beam 6 maintains a substantially constant section, and wings 8 are maintained substantially parallel. From rib 16 onwards, wings 8, as shown in FIG. 1, comprise portions 17 which diverge as far as a second rib 18 defining the inner end of honeycomb 12. Wings 8 extend beyond the said rib 18 and present further respective parallel portions 19, the ends of which, facing the trailing edge of respective blade 5, are connected by a cover plate 20 defining, together with portions 19 and respective core 7, a tubular element 21 substantially parallel with the longitudinal axis of blade 5 and open at the end facing hub 2.

As shown in FIG. 2, cover skin 13 extends beyond the inner end of honeycomb 12 defined by rib 18, and partially envelops tubular element 21 so as to define, between plate 20 of tubular element 21 and rib 18, a chamber 22 housing two known static balancing devices 23 secured to rib 18 and plate 20 respectively.

As shown in FIGS. 1 and 2, each portion 19 of wings 8 forms, at the free end of tubular element 21, a projection 24 extending axially in relation to respective blade 5 and defining, together with the other projection 24 facing it, a fork 25 for supporting a pin 26. For this purpose, each projection 24 presents a through hole 27, the edge of which is surrounded by a reinforcing strip 28 made from synthetic material and which wraps about respective hole 27 and extends along the whole of root 15 as far as rib 16. Respective coaxial bushings 29 are driven and bonded inside holes 27, and engaged by the opposite ends of pin 26.

The intermediate portion of pin 26 extends through a diametrical hole 30 in the spherical rotula 31 of a spherical joint connecting blade 5 to plate 3. Rotula 31 is fitted through a hole 32 formed through plate 3 and engaged by an insert 33 defining a spherical seat 34 for rotula 31.

Figure 4:
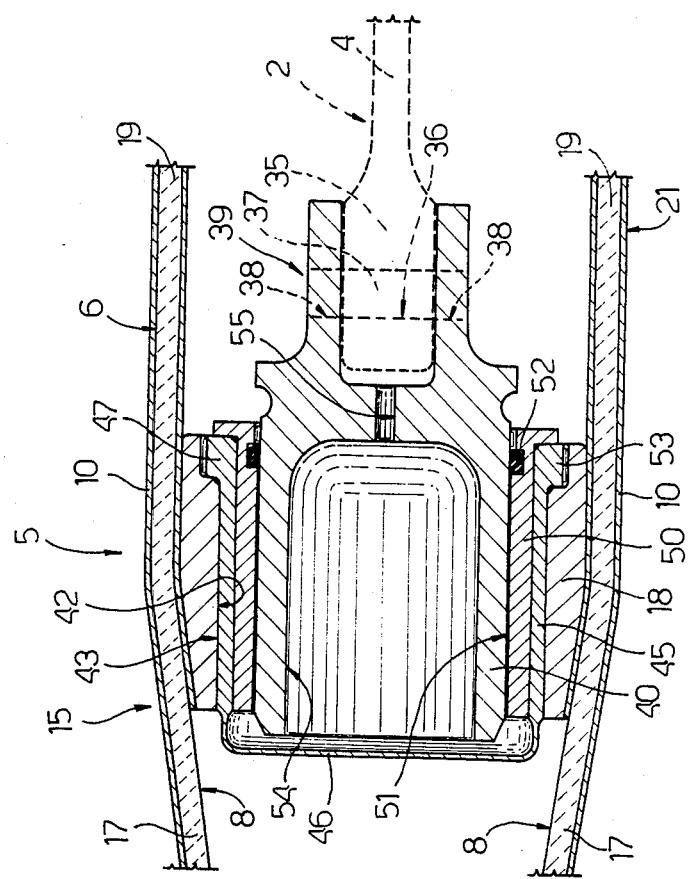
FIG. 4 shows a larger-scale section of a detail in FIG. 1.

As shown, particularly in FIGS. 1 and 4, each leaf 4 extends axially inside respective tubular element 21, and presents, on its free end, a head 35 having a through hole 36 parallel with holes 27 and engaged in rotary manner by the center portion of a hinge pin 37, the opposite end of which project from head 35 and engage respective holes 38 formed through the arms of an axial fork 39 of a hollow pin 40 forming part of an axial joint 41 connecting leaf 4 to respective blade 5.

Figure 5:
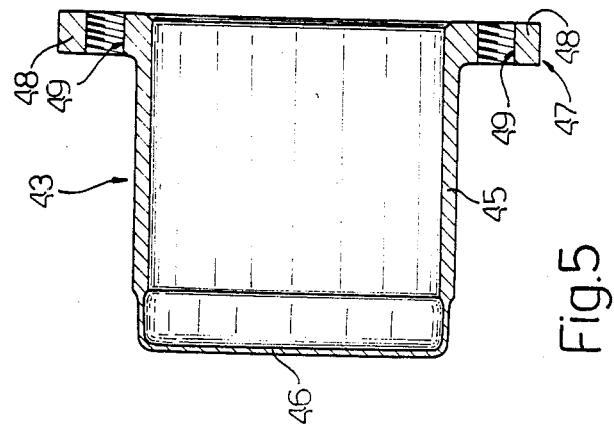
FIG. 5 shows a section of a detail in FIG. 4.

As shown, particularly in FIG. 4, joint 41 engages a hole 42 formed through the portion of rib 18 extending between wings 8, and comprises a cup 43 arranged with its concave side facing respective leaf 4 and, in turn, comprising a cylindrical side wall 45 fitted in airtight manner through hole 42 and bonded to rib 18; an end wall 46; and a flange 47 extending outwards from the free end of wall 45 and having, as shown in FIG. 5, two ears 48, through each of which is formed a threaded through hole 49. Joint 41 also comprises a cylindrical bush 50 of self-lubricating material, fitted inside wall 45 of cup 43, and having a TEFLON-coated inner surface 51 mating with the outer surface of pin 40, via the interposition of a seal 52. On the end facing leaf 4, bushing 50 presents a flange 53 having two through holes (not shown) fitted through with respective screws (not shown) engaged through threaded holes 49 for securing bush 50 in relation to cup 43.

As shown in FIG. 4, pin 40 presents an axial slot 54 facing wall 46 of cup 43 and communicating externally via an axial vent 55.

As shown in FIG. 2, portions 19 of wings 8 are covered externally by respective metal plates 56, which enclose the outer ends of respective bushes 29, and present respective ears 57. The said ears 57 project substantially radially from tubular element 21, and define a fork 58 for adjustably assembling a rod 59 having, on one end, a cup 60 for connecting a pitch-change lever (not shown).

As shown clearly in the foregoing description, each blade 5 of rotor 1 is connected directed to hub 2, with not need for intermediate connected elements, and may be connected directly to the said pitch-change lever.

By virtue of the aforementioned functional characteristics, the weight of blade 5 as described and, consequently also, the whole of rotor 1, is considerably reduced. Furthermore, eliminating the intermediate connecting element between blade 5 and hub 2 provides for greater reliability of rotor 1, as well as for reducing manufacturing cost.

I claim:

1. An auxiliary helicopter rotor comprising a hub and at least two blades extending radially from the said hub; each said blade comprising a root for connecting it to the said hub, and a beam, in turn, comprising two wings extending respectively along the back and face of the said blade; the said hub comprising a center plate and, for each said blade, a leaf extending outwards from the said center plate and connected to the respective said blade; characterized by the fact that the said two wings (8) of each said blade (5) extend in diverging manner along the said root (15) in such a manner as to form a fork (25) integral with each said blade engaged by the said plate (3); spherical joint means (31,33) being located between the said fork (25) and the said plate (3); each said leaf (4) extending inside the respective said fork (25); and unelastic axial joint means (41) being located between each said leaf (4) and the said beam (6) of the respective said blade (5).

2. A rotor as claimed in claim 1, characterised by the fact that each said blade (5) comprises at least a first transverse rib (18) located between the said two diverging wings (8) of the said beam (6); the said axial joint means (41) being located between each said leaf (4) and the respective said transverse rib (18).

3. A rotor as claimed in claim 2, characterised by the fact that the said axial joint means (41) comprise, for each said blade (5), a pin (40) hinged to a free end of the respective said leaf (4), and a bush (50) engaged in axially-sliding manner by the said pin (40); the said rib (18) having a through hole (42) located between the respective said diverging wings (8); and the said bush (50) being fitted inside the respective said hole (42) via the interposition of sealing means (43).

4. A rotor as claimed in claim 3, characterised by the fact that the said sealing means comprise a cup (43) fitted through the respective said hole (42), with its concave side facing the respective said leaf (4), and secured to the respective said rib (18); removable locking means being provided for axially locking each said bush (50) on to the respective said cup (43).

5. A rotor as claimed in claim 1, characterised by the fact that the said fork (25) is closed laterally, so as to form a tubular element (21) engaged by the respective said leaf (4); means (60), for connecting the respective said blade (5) to a pitch-change lever, projecting laterally from the said tubular element (21) and being connected integral with the same.

6. A rotor as claimed in claim 1, characterised by the fact that each said blade (5) comprises an intermediate rib (16); the two respective said wings (8) diverging from the said intermediate rib (16).

* * * * *